G. E. STUDEBAKER.
TRAP NEST.
APPLICATION FILED JAN. 25, 1915.
1,179,050.
Patented Apr. 11, 1916.
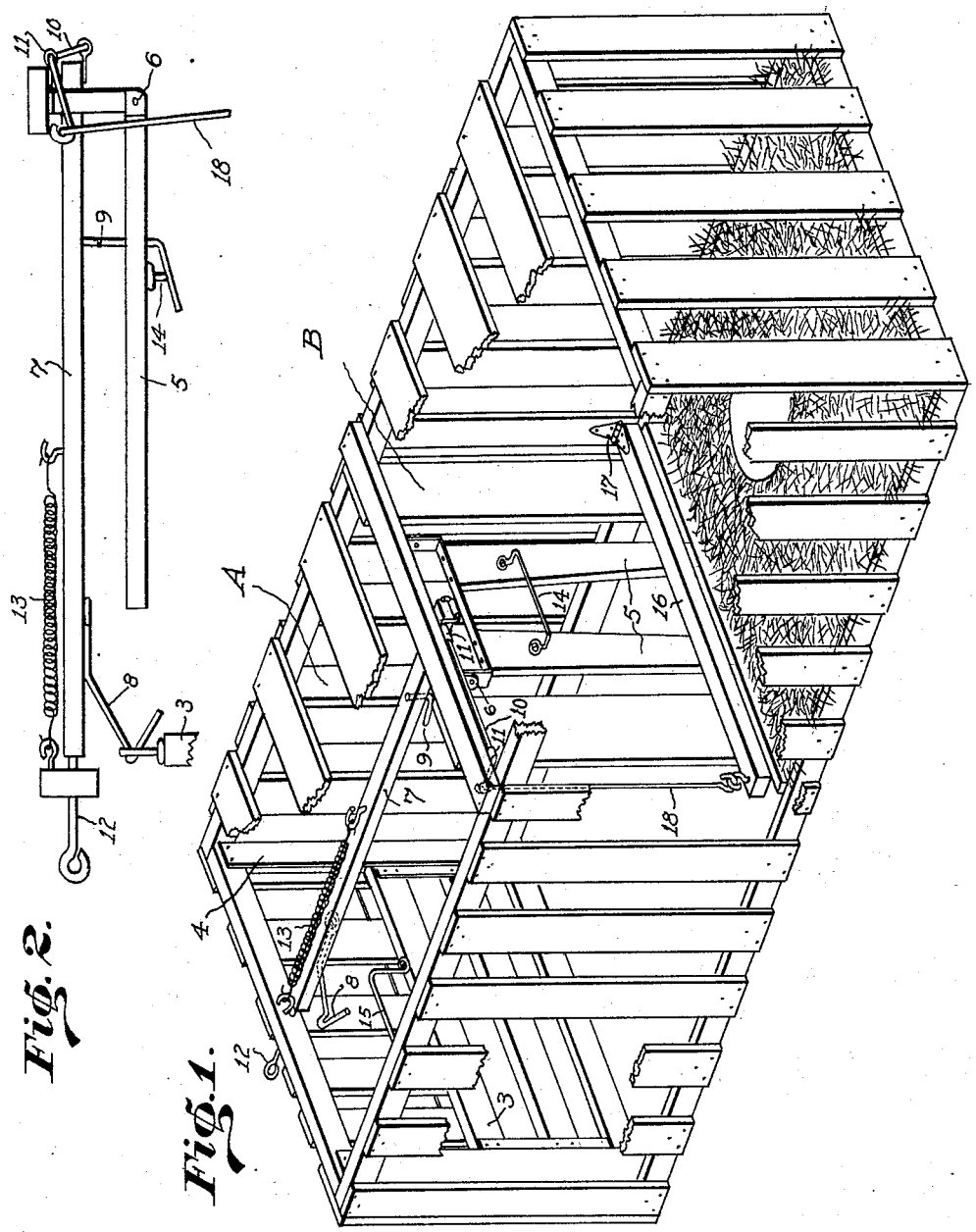
WITNESSES:
Geo. L. Walker
A. L. Wright
INVENTOR
George E. Studebaker.
BY
W. W. Boughton
ATTORNEY

UNITED STATES PATENT OFFICE.

GEORGE E. STUDEBAKER, OF ROCKY FORD, COLORADO.

TRAP-NEST.

1,179,050.

Specification of Letters Patent.

Patented Apr. 11, 1916.

Application filed January 25, 1915. Serial No. 4,086.

*To all whom it may concern:*

Be it known that I, GEORGE E. STUDEBAKER, a citizen of the United States, and a resident of Rocky Ford, in the county of Otero and State of Colorado, have invented a certain new and useful Improvement in Trap-Nests, of which the following is a full, clear, and exact description.

This invention is an improvement in trap nests of the type wherein the hen is retained after laying in order that each egg may be identified by record with the hen laying it.

The principal objects of the invention are the provision of a nest which may be easily and readily set, and which will retain the hen after laying in a compartment separate from the nest and also from the remainder of the poultry so that the nest and egg will be secure from disturbance by the hen and still the hen which has laid a particular egg may be positively identified.

More particularly, a further object of the invention is the provision of a single retaining means or trigger for two doors, which means are capable of being successively and separately set without the setting of the second door springing the trigger to release the first door set.

In the single sheet of drawings accompanying this application and forming a part hereof Figure 1 is a perspective, parts of the sides being broken away to disclose the interior, of the nest showing the parts in closed position such as assumed when the hen is on the nest; and Fig. 2 is a partial side view of the movable parts, showing said parts in the position taken when the doors are open and the nest is set for the entrance of a hen.

In the preferred embodiment of my invention shown in the drawings, the nest is built in slatted form and has two compartments, an outer compartment A and an inner one B, arranged in series or tandem, a doorway being provided in the front of the outer compartment A and another doorway affording communication between the compartments. In the form shown in the drawings the outer door 3 is mounted to freely slide vertically in ways 4 and the inner one 5 is pivoted at 6 to swing freely into the outer compartment about a horizontal axis at its top.

The reference numeral 7 indicates a trigger bar which carries two triggers 8 and 9, the former being employed to retain the outer door 3 in open position and the latter to similarly hold the inner door 5. This bar 7 is carried at its rear by one end of a bell crank lever 10 which is supported from the frame of the nest by eyes 11 and the bar 7 terminates at the front in a rod 12 which passes through an opening in the frame and is provided at its front end with a loop for ease in manipulation. A tension spring 13 attached at one end to the frame and at the other end to the bar 7 tends to hold the bar always toward the front of its limit of movement. Latches 14 and 15 on the doors 5 and 3 are in position to be engaged by the triggers 8 and 9 respectively to retain the doors 5 and 3 open and it will be observed that these triggers are so proportioned that the door 3 will be released first and also that, if, in the act of setting the trap the door 5 has been already retained by the trigger 9, the trigger bar 7 may be sufficiently displaced to bring the trigger 8 into engagement without releasing the door 5.

A treadle 16 is hinged to the frame at 17 and extends across the doorway between the compartments so that a fowl in passing through will step thereon. At the end opposite to 17 a link 18 connects the treadle 16 with one end of the bell crank 10 and furnishes means for tripping the device.

Operation: To set the nest the door 5 is raised to the position of Fig. 2 and the trigger bar 7 retracted, either by pushing on the rod 12 or by depressing the treadle 16, until the latch 14 is engaged by the trigger 9 and the door 5 secured in open position. Then the door 3 may be raised and the latch 15, engaging the trigger 8, will retract the bar 7 sufficiently to allow the trigger 8 to pass behind the latch 15—without moving the bar 7 sufficiently to free the door 5; the nest is now ready for the entrance of a hen. The hen enters through the front doorway, passes through the doorway between the compartments, and in so passing steps on the treadle 16, depresses it and, through the link 18 and bell crank 10, retracts the trigger bar 7 sufficiently to allow both doors to close, thus shutting the hen in and securing her from molestation while laying. After the hen has laid she will look around for an exit and will be attracted by the fact that the space between the slats is wider at the door 5. Pushing against this door the hen easily raises it and passes into the compartment A but is retained there by the door 3 which is closed and by the fact that the door will not swing in the opposite direction. She is thus retained in the structure but in a separate compartment from the nest and the egg, where there is no danger of her breaking the egg or disturbing the nest, until the attendant comes to free her, make a record and set the nest for the next hen.

Having thus described my invention what I claim and desire to secure by Letters Patent is:

1. In a device of the class described, an outer compartment, a gravity operated door in the front wall of said compartment, an inner compartment, a gravity operated door between said compartments, trigger means arranged to hold both doors open, and a treadle so positioned as to be depressed by a hen in passing between said compartments to trip said trigger means and allow both said doors to close behind the hen.

2. In a device of the class described, an outer compartment, a gravity operated door in the front wall of said compartment, an inner compartment, a gravity operated door between said compartments, trigger means arranged to hold both said doors open and to liberate said outer door first, and a treadle adapted to be depressed by a hen in passing between said compartments to trip said trigger means and allow both said doors to close.

3. In a device of the class described, an outer compartment, a gravity operated door in the front wall of said compartment, an inner compartment, a door between said compartments, said last mentioned door being mounted to swing freely about a horizontal axis on its upper side, trigger means arranged to hold both said doors open, and a treadle so positioned as to be depressed by a hen in passing between said compartments to trip said trigger means and allow both said doors to close behind the hen.

4. In a device of the class described, an outer compartment, a door freely slidably mounted in vertical ways in the front wall of said compartment, an inner compartment, a door between said compartments, said last mentioned door being mounted to swing freely into said first mentioned compartment only about a horizontal axis on its upper side, and a single trigger means for retaining both said doors in open position.

5. In a device of the class described, an outer compartment, a door freely slidably mounted in vertical ways in a wall in said compartment, a latch on said door, an inner compartment, a door between said compartments, said last mentioned door having a latch thereon and being mounted to swing about a horizontal axis on its upper side, a trigger bar slidably mounted at its front end in the wall of the front compartment, a bell crank lever on which the rear end of said trigger bar is mounted, triggers on said trigger bar adapted to engage said latches, and a treadle adapted to be depressed by a hen in passing between said compartments and having connection to said bell crank lever, whereby a hen in passing between said compartments will actuate said trigger bar to free both said doors and permit them to close.

In testimony whereof I have hereunto affixed my signature in the presence of two witnesses.

GEORGE E. STUDEBAKER.

Witnesses:
A. W. WOODS,
CHARLES SWIFT.

Copies of this patent may be obtained for five cents each, by addressing the "Commissioner of Patents, Washington, D. C."